United States Patent

Oksa et al.

[11] Patent Number: 5,871,106
[45] Date of Patent: Feb. 16, 1999

[54] CAULK TUBE HOLDER

[76] Inventors: John William Oksa, 1704 SE. 21st, Mineral Wells, Tex. 76067; Preston Roy Clay, Rt. 1, Box 237M-1, Lipan, Tex. 76462

[21] Appl. No.: 795,989

[22] Filed: Feb. 5, 1997

[51] Int. Cl.⁶ .................................................. A47F 1/04
[52] U.S. Cl. ........................... 211/70.6; 248/314; 211/113
[58] Field of Search ................................. 248/311.2, 314; 211/60.1, 113, 70.6

[56] References Cited

U.S. PATENT DOCUMENTS

| | | | |
|---|---|---|---|
| 4,453,655 | 6/1984 | Smilow et al. | 211/60.1 X |
| 4,795,211 | 1/1989 | Stern et al. | 248/311.2 X |
| 4,830,247 | 5/1989 | Banks | 224/252 |
| 4,863,134 | 9/1989 | Young et al. | 248/311.2 |
| 4,867,360 | 9/1989 | Howard | 248/314 X |
| 5,004,136 | 4/1991 | Leath | 224/253 |
| 5,013,004 | 5/1991 | Wilkins et al. | 211/113 X |
| 5,232,137 | 8/1993 | Devine | 224/252 |
| 5,294,028 | 3/1994 | Bankroff | 224/148 |
| 5,337,907 | 8/1994 | McKenzie et al. | 211/88 |
| 5,361,950 | 11/1994 | Signal et al. | 248/311.2 X |
| 5,385,281 | 1/1995 | Byrd | 224/148 |
| 5,487,190 | 1/1996 | Thompson | 2/102 |
| 5,544,764 | 8/1996 | Cima | 211/60.1 |
| 5,584,455 | 12/1996 | Artemi | 211/113 X |

*Primary Examiner*—Peter M. Cuomo
*Assistant Examiner*—Stephen Vu
*Attorney, Agent, or Firm*—Max Ciccarelli

[57] ABSTRACT

A holder for a caulk tube comprises a rigid cylinder having a bottom with a hole therethrough. The caulk tube fits in the cylinder with the dispensing tip extending through the hole in the bottom of the cylinder. A hanging mechanism allows the holder to be hung from various objects.

3 Claims, 1 Drawing Sheet

CAULK TUBE HOLDER

BACKGROUND OF THE INVENTION

1. Field of the Invention

This invention relates in general to holders for tools and in particular to a holder for tubes of caulk, adhesives and other compounds.

2. Description of the Prior Art

Caulks, adhesives and other compounds (referred to herein collectively as "caulk") are widely used in the construction and painting professions. Caulk is most often sold in disposable tubes. The standard caulk tubes have a dispensing tip at one end, and a piston at the opposite end. The term "caulk tube" as used herein refers to tubes of adhesive and other compounds as well as caulk. As the piston is pressed toward the tip, it pushes caulk through the dispensing tip. Caulking guns that accept these standard tubes and facilitate the dispensing of the caulk from the tube are well known. When the user empties a caulk tube, he or she can simply discard the empty tube and insert a full one into the caulking gun.

Workers in the construction and painting professions often work on ladders, scaffolds, and other places removed from their stock of supplies. Because so much caulk is used, it is often necessary to descend from the ladder, scaffold, or other location to obtain a fresh tube of caulk. These repeated trips to obtain fresh tubes of caulk are not only tiring and time-consuming, they can also be dangerous.

Some workers place several tubes in a bucket and leave the bucket near the work area. This shortens the trips. However, when working on ladders, having to go up and down the ladder to retrieve fresh tubes of caulk is still tiring, time-consuming, and dangerous.

U.S. Pat. No. 5,487,190 discloses a vest with horizontal sleeves formed from an elastic fabric. The sleeves are designed to hold tubes of caulk. The vest allows the user to carry multiple tubes of caulk, thus avoiding the frequent trips to the supply area. However, the vest is uncomfortable and reduces the worker's freedom of movement. In hot climates or working conditions, the vest can be particularly uncomfortable. Also, the vest does not protect the tubes from damage when the worker accidentally bumps or leans into a hard or sharp object.

SUMMARY OF THE INVENTION

It is the general objective of the invention to provide a holder that holds one or more tubes of caulk and that allows a worker to keep the tube(s) of caulk nearby while he or she is working. It is a further objective of the invention to provide a caulk tube holder with a hanging means that allows the hanging of the holder from different places. It is a further objective of the invention to provide a caulk tube holder that protects the tube(s) of caulk from accidental damage while in the holder.

The holder of the present invention comprises at least one elongate cylinder with an inner diameter larger than the outer diameter of the caulk tube. The cylinder has a bottom with an opening adapted to receive the dispensing tip of the caulk tube. The cylinder is rigid so as to protect the caulk tube from damage. A hanging means allows the holder to be hung from a variety of objects.

The above as well as additional objectives, features, and advantages will become apparent in the following description.

DETAILED DESCRIPTION OF THE INVENTION

Figure 1:
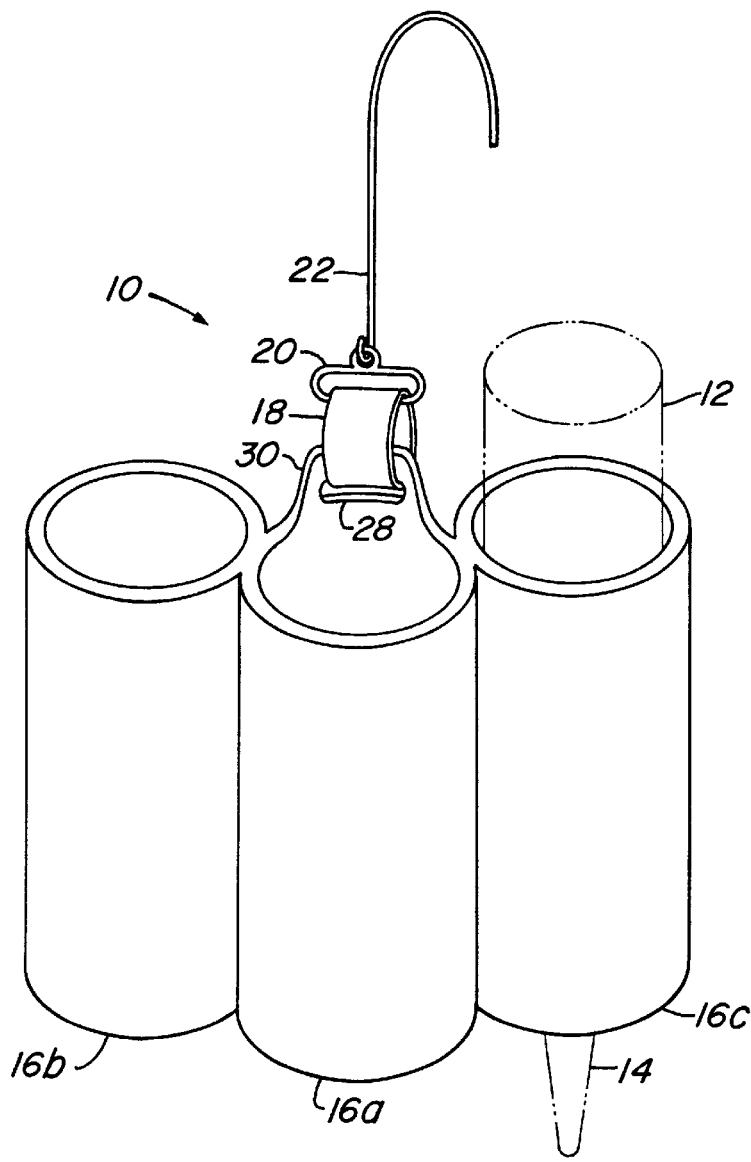
FIG. 1 is a perspective view showing primarily the top and front of the present invention.

FIG. 1 shows the present invention, holder 10, for holding caulk tubes 12 having dispensing tips 14. Holder 10 comprises three elongate cylinders 16a, 16b, and 16c. Cylinder 16b is connected, along the length of its exterior wall, to center cylinder 16a. Similarly, cylinder 16c is connected, along the length of its exterior wall, to center cylinder 16a. The three cylinders 16a, 16b, and 16c could be arranged in a straight line, but preferably, and as shown in FIGS. 1 and 2, they are connected in a semi-circular arrangement for reasons explained below.

The center cylinder 16a has a horizontal, elongate slot 28 in an upper portion of its wall. Located through slot 28 and forming a loop is a flexible strap 18. Strap 18 is also threaded through a clip 20. Clip 20 has a flat loop for threading the strap 18, and a smaller loop for connecting to hook 22. Hook 22 is a J-shaped hook for hanging the holder 10 from any suitable object. Examples of objects from which holder 10 can be hung include: the waistband of the user's trousers, the user's belt, the pocket(s) of the user's clothing, a rung of a ladder, and an exposed beam or similar object.

Figure 2:
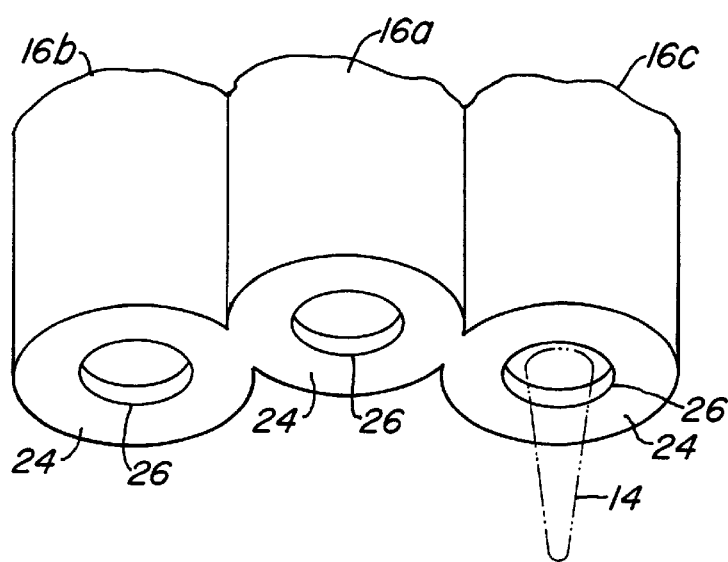
FIG. 2 is a partial perspective view showing primarily the bottom and part of the front of the present invention.

As shown in FIG. 2, each of the cylinders 16a, 16b, and 16c has a bottom 24. In the center of each of the bottoms 24 is a hole 26. Hole 26 is sized so as to accept the tip 14 of the caulk tube 12. Bottoms 24 support the caulk tube 12 within the cylinders 16a, 16b, and 16c.

Slot 28 is shown in FIG. 1 as being located in a protrusion 30 extending from the top of cylinder 16a and extending above the tops of cylinders 16a, 16b, and 16c. However, those skilled in the art would appreciate that the protrusion 30 could be eliminated and the slot 28 instead placed in the wall of cylinder 16a, below the tops of cylinders 16a, 16b, and 16c.

Cylinders 16a, 16b, and 16c can be constructed of any suitable rigid material. Injection molded plastic, PVC, and aluminum are some examples. Several other materials can be used. The three cylinders 16a, 16b, and 16c can be constructed as one unit using a single mold, or they can be constructed individually and then joined one to the other. If the latter method is used, the cylinders can be ground down along the line of contact so that they contact along a surface, thus facilitating the gluing process.

Cylinders 16a, 16b, and 16c are sized so that the inner diameter is just a little larger than the outer diameter of the standard caulk tube. In most cases that is approximately two inches.

Strap 18 can be constructed of any suitable flexible material. Nylon webbing is just one example. The material should be flexible so as to allow some, but not excessive twist. Some twist will allow the holder 10 to remain against the user's body, probably the leg, even during movement. Also, some flexibility will allow the hook 22 to support holder 10 from more varied objects.

In the preferred embodiment, clip 20 is a metal clip with an elongate, thin loop at the bottom through which is threaded the strap 18, and a smaller loop at the top to which is connected the hook 22.

As those skilled in the art will appreciate, there are other ways in which to connect the hook 22 to cylinder 16a. For example, a hole could replace slot 28, and the hook 22 could be attached directly to that hole. Also, hook 22 does not necessarily have to be attached to cylinder 16a, but could be attached to one or more of any of the three cylinders 16a, 16b, and 16c.

The length of cylinders 16a, 16b, and 16c is such that the cylinders 16a, 16b, and 16c cover a majority of the caulk tube. By majority it is meant at least about one-half of the caulk tube 12 but preferably two thirds or more. This is to provide protection for caulk tube 12 in the event of accidental bumping into other objects. Protection of caulk tube 12 is important because if the tube is dented or otherwise damaged, is could prevent the piston inside the tube from sliding down the inside of the caulk tube 12, thus rendering the caulk tube 12 useless.

In operation, the user attaches hook 22 to his or her belt, waistband, pocket, or other article of clothing, and inserts a caulk tube 12 into each of cylinders 16a, 16b, and 16c (for clarity, only one caulk tube 12 is shown in FIGS. 1 and 2). When the holder 10 is suspended from the waistband or belt of the user, the semi-circular arrangement of the cylinders 16a, 16b, and 16c conforms to the user's leg. This adds comfort, maintains the holder 10 in place, and keeps the holder 10 as close to the user's body as possible, thus reducing the chances that the holder gets in the way of the user.

The user then proceeds about his or her work, probably using a caulking gun. When he or she empties a tube of caulk, he or she removes the used tube from the caulking gun, removes a fresh caulk tube 12 from the holder 10, places it in the caulking gun, and proceeds with the work at hand. If the user needs greater mobility to reach hard-to-reach places, he or she can unhook the holder 10 from his or her clothing and can use hook 22 to hook holder 10 to a rung of a ladder, an exposed beam, or any other object that hook 22 can secure itself to.

Even if the user bumps into the corner of a wall or other sharp hard object, the rigid cylinders 16a, 16b, and 16c will protect the caulk tubes 12 from being damaged. The caulk tubes 12 are inserted with the tips 14 facing downward to prevent the user's waist and torso from being poked by the tips 14, and to prevent other tools from getting caught on tips 14.

As one skilled in the art will appreciate, the holder 10 can be made with more or fewer cylinders. If a larger capacity is desired, additional cylinders can be attached to cylinders 16a, 16b, and 16c. If a lighter, smaller holder is desired, just one or two cylinders can be used.

While the invention has been particularly shown and described with reference to a preferred embodiment, it will be understood by those skilled in the art that various changes in form and detail may be made therein without departing from the spirit and scope of the invention.

What is claimed is:

1. A holder for a caulk tube of the generally cylindrical type with a dispensing tip protruding longitudinally from a generally flat end of the caulk tube, the holder comprising:

at least one rigid elongate cylinder adapted to receive the caulk tube and cover a majority thereof;

the cylinder having a generally flat bottom extending inwardly from a bottom portion of the cylinder;

a hole extending through the bottom and adapted to receive the dispensing tip of the caulk tube, wherein the holder adapted to receive and support the caulk tube within the cylinder with the tip of the caulk tube extending downward through the hole with the bottom supporting the caulk tube; and a hanging system located at an upper end of the elongate cylinder and adapted to selectively and removably hang the holder from another object, the hanging system comprising:

a slot in an upper portion of the cylinder, the slot extending through a wall of the cylinder;

a strap located through the slot and forming a loop; and a hanging device connected to the strap; and a clip having a loop through which the strap is threaded and a smaller loop to which the hanging device is connected.

2. A caulk tube holder in combination with a caulk tube, the caulk tube holder comprising:

a generally cylindrical caulk tube having an outer diameter and a dispensing tip protruding longitudinally from an end of the tube;

at least one elongate cylinder having a wall defining an inner diameter and having upper and lower ends;

the inner diameter of the elongate cylinder being larger than the outer diameter of the caulk tube;

the lower end of the cylinder being partially closed by a bottom extending inwardly from the wall of the cylinder and having a hole extending therethrough to accept the dispensing tip of the caulk tube;

the elongate cylinder being more rigid than the caulk tube so as to protect the caulk tube from damage;

a hanging device for hanging the holder from another object, the hanging device being connected to the elongate cylinder; and a slot extending through the wall of the elongate cylinder and a strap extending through the slot and forming a loop, the strap being connected to the hanging device.

3. A caulk tube holder in combination with a caulk tube, the caulk tube holder comprising:

a generally cylindrical caulk tube having an outer diameter and a dispensing tip protruding longitudinally from an end of the tube;

at least one elongate cylinder having a wall defining an inner diameter and having upper and lower ends;

the inner diameter of the elongate cylinder being larger than the outer diameter of the caulk tube;

the lower end of the cylinder being partially closed by a bottom extending inwardly from the wall of the cylinder and having a hole extending therethrough to accept the dispensing tip of the caulk tube;

the elongate cylinder being more rigid than the caulk tube so as to protect the caulk tube from damage;

a hanging device for hanging the holder from another object, the hanging device being connected to the elongate cylinder; and a clip for connecting the hanging device to the strap, the clip comprising an elongate loop through which the strap is threaded and a smaller loop to which the hook is connected.

* * * * *